United States Patent
Shibukawa (10) Patent No.: US 7,201,701 B2
(45) Date of Patent: Apr. 10, 2007

(54) POWER ROLLER SUPPORT STRUCTURE FOR TOROIDAL CONTINUOUSLY-VARIABLE TRANSMISSION

(75) Inventor: Yuichi Shibukawa, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 532 days.

(21) Appl. No.: 10/617,724

(22) Filed: Jul. 14, 2003

(65) Prior Publication Data

US 2004/0029675 A1     Feb. 12, 2004

(30) Foreign Application Priority Data

Aug. 7, 2002    (JP)    ............... 2002-229872

(51) Int. Cl.
   *F16H 15/38*   (2006.01)
(52) U.S. Cl. ............... 476/40; 476/42; 476/46
(58) Field of Classification Search ............ 476/10, 476/40, 42, 46
   See application file for complete search history.

(56) References Cited

U.S. PATENT DOCUMENTS 3,087,348 A * 4/1963 Kraus ................. 476/10
5,697,863 A * 12/1997 Dawe et al. ............ 476/10
5,895,337 A * 4/1999 Fellows et al. ......... 476/10
6,162,144 A * 12/2000 Haka ................... 476/10

FOREIGN PATENT DOCUMENTS

JP   6-280959 A   10/1994
JP   8-145138 A    6/1996

* cited by examiner

*Primary Examiner*—William C. Joyce
(74) *Attorney, Agent, or Firm*—Foley & Lardner LLP (57) ABSTRACT

A power roller supporting structure for a toroidal continuously variable transmission, including a moveable disk, a stationary disk, the disks being rotatable about a first axis, power rollers disposed between the moveable and stationary disks and rotatable about a second axis and pivotally moveable about a third axis extending perpendicular to the second axis upon rotation of the moveable and stationary disks, the power rollers having a low speed ratio position where a reduced speed ratio between rotational speeds of the disks is obtained and a high speed ratio position where an increased speed ratio therebetween is obtained, and an arrangement for allowing the power rollers to move closer to the first axis along the second axis when the power rollers are placed in the low speed ratio position than when the power rollers are placed in the high speed ratio position.

16 Claims, 8 Drawing Sheets

PRIOR ART

POWER ROLLER SUPPORT STRUCTURE FOR TOROIDAL CONTINUOUSLY-VARIABLE TRANSMISSION

BACKGROUND OF THE INVENTION

The present invention relates to a toroidal continuously variable transmission (CVT) for a vehicle, and more specifically to a power roller support structure for the toroidal CVT.

In general, toroidal CVTs have input and output disks arranged to be rotatable about a common rotation axis, and a plurality of power rollers interposed between the input and output disks in friction contact therewith via an oil film. Upon operating the toroidal CVTs, the power rollers are pressed between the input and output disks by applying thereto a thrust corresponding to a transmission torque. A shear force of the oil film is caused corresponding to the pressing force applied to the power rollers. Owing to the shear force, the power rollers transmit power between the input and output disks. Each of the power rollers is supported on a trunnion so as to be rotatable about a rotation axis and pivotally moveable about a pivot axis (trunnion axis) perpendicular to the rotation axis of the power roller. Upon the speed change operation of the toroidal CVT, the trunnion is displaced or offset from the non-speed change position where the rotation axis of the power roller is perpendicular to the common rotation axis of the input and output disks, along a direction of the pivot axis of the power roller. With the displacement of the trunnion, the power roller is allowed to pivotally move about the pivot axis due to component of the rotation force of the input disk. This causes change in the contact position of the power roller relative to each of the input and output disks, then causing a variation of the rotation speed ratio between the input disk and the output disk, i.e., a speed ratio. Thus, the speed ratio of the toroidal CVT can be continuously varied.

The power rollers tend to be pushed out from a toroidal cavity formed by contact surfaces of the input and output disks during the operation of the toroidal CVT. In order to avoid the push-out of the power rollers from the toroidal cavity, upper end portions of the trunnion are joined together with those of the adjacent trunnion via an upper link, and lower end portions of the trunnion are joined together with those of the adjacent trunnion via a lower link. The upper and lower end portions of the trunnion are connected with the upper and lower links by means of a combined joint which is constituted of an outer spherical joint and an inner bearing. The combined joint is mounted to each of the end portions of the trunnion and engaged with a trunnion connection hole formed in each of the upper and lower links.

However, the pressing force applied to the power rollers tends to cause elastic deformation of the trunnions and the input and output disks. Due to the elastic deformation, the power rollers are displaced from a predetermined contact position or a predetermined speed ratio position relative to the input and output disks in which a target speed ratio is obtained.

Japanese Patent Application First Publication No. 6-280959 discloses a power roller support structure for holding the power rollers in the predetermined speed ratio position upon the occurrence of the elastic deformation of the trunnions and the input and output disks.

Figure 8A:
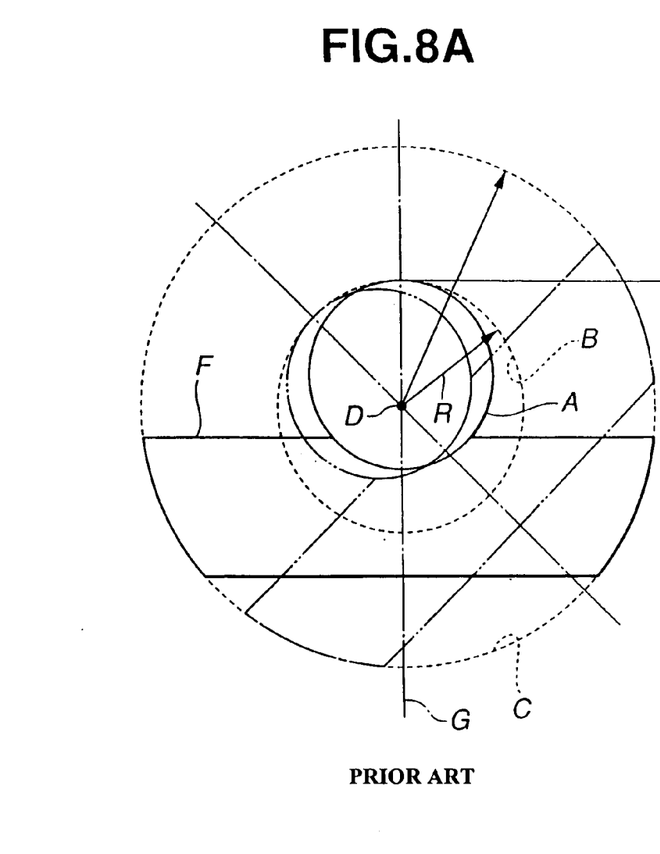
FIG. 8A is an explanatory diagram showing, in plan view, engagement of an end portion of a trunnion with a trunnion connection hole of a link in a power roller support structure of a related art.

FIG. 8A is an explanatory diagram schematically illustrating the power roller support structure of the related art as described above. As illustrated in FIG. 8A, end portion A of a trunnion, namely, an outer spherical joint of a combined joint, is engaged with trunnion connection hole B of a link. A circumferential surface of end portion A of the trunnion bears against the periphery of trunnion connection hole B when power roller F is pressed between the input and output disks due to the thrust applied to the input disk. Trunnion connection hole B is formed concentrically with center D of curvature of contact surface C of the respective input and output disks. Radius R of trunnion connection hole B is selected such that power roller F is placed in a position approaching close to a common rotation axis of the input and output disks along rotation axis G of power roller F, more specifically, power roller F is located in such a position projecting downwardly as viewed in FIG. 8A.

SUMMARY OF THE INVENTION

However, in the power roller support structure as shown in FIG. 8A, the amount of approach of power roller F is constant regardless of change in the speed ratio position of power roller F during the pivotal movement of power roller F. As illustrated in FIG. 8A, the approach amount provided in the speed ratio position as indicated by solid line, where the speed ratio is 1:1, is substantially equal to the approach amount provided in the speed ratio position as indicated by two-dotted broken line, where the speed ratio is low. This is because trunnion connection hole B is formed concentrically with center D of curvature of contact surface C of the respective input and output disks.

Since the pressing force applied to the power rollers is varied corresponding to the transmission torque, the degree of the elastic deformation caused due to the pressing force is varied depending on the transmission torque. When the contact position of the power rollers relative to the input and output disks is displaced or offset from the predetermined speed ratio position due to the elastic deformation, an amount of the displacement of the contact position will vary depending on the transmission torque. Actually, the amount of the displacement of the contact position varies depending on the predetermined speed ratio position of the power roller because the speed ratio is determined based on the transmission torque.

If the approach amount of power roller F is fixed only by radius R of trunnion connection hole B of the link regardless of the transmission torque (the predetermined speed ratio position) as discussed above about the power roller support structure of the related art, the approach amount of power roller F must be determined based on any one of the predetermined speed ratio positions. Here, if the approach amount of power roller F is set to a small value corresponding to a high speed ratio position where the transmission torque is small and a high speed ratio between rotational speeds of the input and output disks is obtained, the approach amount of power roller F will become insufficient when power roller F is located in a low speed ratio position where the transmission torque is large and a low speed ratio between rotational speeds of the input and output disks is obtained. This increases an angle formed by the normals of the contact surface of the power roller at the contact points relative to the input and output disks. As a result, in the low speed ratio position, the power roller will come into contact with peripheral edges of the input and output disks. In order to prevent the contact of the power roller with the peripheral edges of the disks, variation of the speed ratio must be limited in a undesirably small range. In contrast, if the approach amount of power roller F is set to a large value corresponding to the low speed ratio position, the approach amount of power roller F will become excessively large when power roller F is located in the high speed ratio position. This reduces the angle formed by the normals of the contact surface of the power roller at the contact points relative to the input and output disks. Therefore, the thrust applied to the power roller will increase, causing deterioration of the life of the power roller. In order to prevent the deterioration of the life of the power roller, the durability of the toroidal CVT must be enhanced so that the toroidal CVT will be upsized.

It is an object of the present invention to eliminate the above-described problems and provide a toroidal continuously variable transmission (CVT) having a power roller support structure which is capable of counterbalancing the displacement of a power roller from a predetermined contact position of the power roller relative to input and output disks which is caused due to the elastic deformation generated during an operation of the toroidal CVT, over the entire range of the speed ratio.

In one aspect of the present invention, there is provided a power roller supporting structure for a toroidal continuously variable transmission, the power roller supporting structure comprising:
a moveable disk rotatable about a first axis and axially moveable;
a stationary disk rotatable about the first axis and axially fixed, each of the moveable and stationary disks having a contact surface;
power rollers disposed between the moveable and stationary disks in contact with the contact surfaces thereof, each of the power rollers being rotatable about a second axis and pivotally moveable about a third axis extending perpendicular to the second axis upon rotation of the moveable and stationary disks, the power rollers having a friction contact position relative to the moveable and stationary disks in which a speed ratio between rotational speeds of the moveable and stationary disks is determined, the friction contact position including a low speed ratio position where a reduced speed ratio is obtained and a high speed ratio position where an increased speed ratio is obtained; and
an arrangement for allowing the power rollers to move closer to the first axis along the second axis when the power rollers are placed in the low speed ratio position than when the power rollers are placed in the high speed ratio position.

In another aspect of the invention, there is provided a power roller supporting structure for a toroidal continuously variable transmission, the power roller supporting structure comprising:
a moveable disk rotatable about a first axis and axially moveable;
a stationary disk rotatable about the first axis and axially fixed, each of the moveable and stationary disks having a contact surface;
power rollers disposed between the moveable and stationary disks in contact with the contact surfaces thereof, each of the power rollers being rotatable about a second axis and pivotally moveable about a third axis extending perpendicular to the second axis upon rotation of the moveable and stationary disks, the power rollers having a friction contact position relative to the moveable and stationary disks in which a speed ratio between rotational speeds of the moveable and stationary disks is determined, the friction contact position including a low speed ratio position where a reduced speed ratio is obtained and a high speed ratio position where an increased speed ratio is obtained;
trunnions supporting the power rollers so as to allow the rotation of the power rollers about the second axis and the pivotal movement thereof about the third axis, each of the trunnions having end portions opposed in a direction of the third axis, wherein the arrangement comprises:
a first link including a first periphery defining a first trunnion connection hole engaged with one of the end portions of each of the trunnion; and
a second link including a second periphery defining a second trunnion connection hole engaged with the other of the end portions of each of the trunnions;
at least one of the first and second trunnion connection holes being arranged to allow the power rollers to move closer to the first axis along the second axis when the power rollers are placed in the low speed ratio position than when the power rollers are placed in the high speed ratio position.

DETAILED DESCRIPTION OF THE INVENTION

Figure 8B:
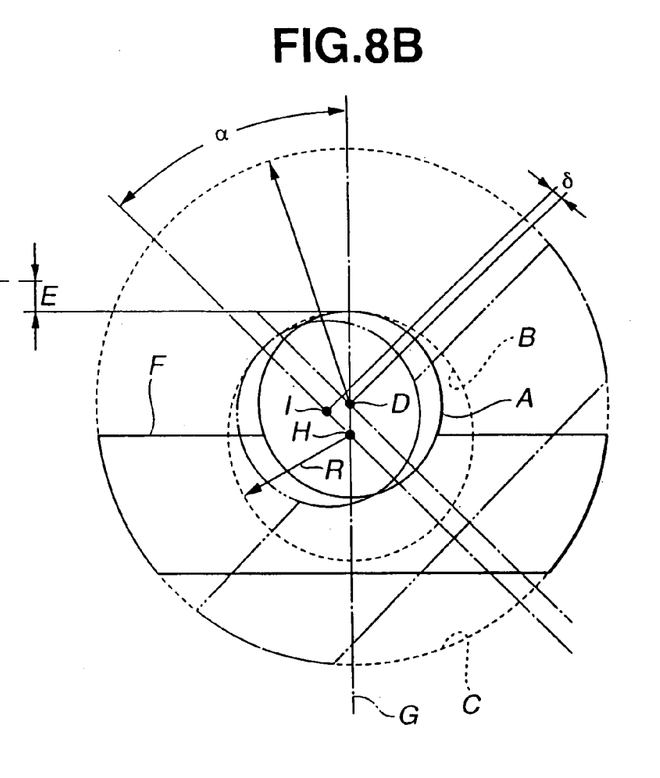
FIG. 8B is an explanatory diagram showing, in plan view, a theory of the present invention as compared with the related art of FIG. 8A.

Referring to FIG. 8B, a theory of the present invention now is explained. FIG. 8B shows an arrangement of trunnion connection hole B of the link, which differs from the arrangement thereof shown in FIG. 8A. As illustrated in FIG. 8B, the center of trunnion connection hole B is displaced from center D of curvature of contact surface C of the disks relative to power roller F to the position indicated at H by amount E in a downward direction along rotation axis G of power roller F. The downward direction as viewed in FIG. 8B is such a direction that center H comes close to the rotation axis of the disks. Here, the center of end portion (outer spherical joint) A of the trunnion is assumed to be in alignment with center D of curvature of contact surface C of the disks. In this state, if power roller F is leftward pivoted about center D by angle α to move from the non-speed change position (the speed ratio of 1:1) as indicated by solid line to the position as indicated by two-dot chain line while end portion A of the trunnion is pressed against a peripheral surface defining trunnion connection hole B due to the push-out force applied to power roller F via the disks, the center of end portion A of the trunnion will be displaced from position D to position I. Therefore, the amount of approach of power roller F relative to the rotation axis of the disks is reduced by amount δ indicated in FIG. 8B, as compared with the approach amount of power roller F which is placed in the non-speed ratio position. Amount δ is represented by the following formula:

$$\delta = E \times \{1 - \cos \alpha\}$$

wherein,

E is the amount of displacement of the center of trunnion connection hole B, and α is the angle of pivotal displacement of power roller F. Based on the theory described above, the present invention contemplates providing of a power roller support structure in which the approach amount of the power roller can be reduced when the power roller is placed in the high speed ratio position, and the approach amount of the power roller can be increased when the power roller is placed in the low speed ratio position.

Referring to FIGS. 1–4, there is shown a toroidal continuously variable transmission (CVT) having a power roller support structure of a first embodiment of the present invention. The toroidal CVT is a so-called dual-cavity toroidal CVT having two toroidal CVT units, namely, front toroidal CVT unit 2 and rear toroidal CVT unit 3, which are arranged in tandem in an axial direction of main shaft 10.

Each of toroidal speed change units 2 and 3 includes coaxially arranged input disk 4, 5 and output disk 6, 7, and power rollers 8, 9 disposed between input and output disks 4, 6, and 5, 7. Input and output disks 4–7 are supported on main shaft 10 so as to rotate about common rotation axis $O_3$ aligned with the axis of main shaft 10. Front-side input disk 4 and rear-side input disk 5 are rotatably engaged with main shaft 10 via ball spline 11 and axially slidable on main shaft 10. Rear-side input disk 5 is prevented from being removed from main shaft 10 by loading nut 12 screwed on main shaft 10. Front-side output disk 6 and rear-side output disk 7 are connected with each other via hollow output shaft 13 rotatably supported on main shaft 10. Output disks 6 and 7 are connected with each other via hollow output shaft 13 which is rotatably mounted onto main shaft 10. Output disks 6 and 7 are thus rotatably supported on main shaft 10 but axially immovable or fixed thereon by provision of bearing 51 and output shaft 13. Bearing 51 may be in the form of a needle bearing. Output disks 6 and 7 are arranged back-to-back in an axially spaced relation to each other, between which gear housing 32 is interposed as explained later. Front-side input and output disks 4, 6 and rear-side input and output disks 5, 7 have contact surfaces cooperating to form a toroidal cavity in which power rollers 8 and 9 are disposed. Power rollers 8 and 9 are in contact with the contact surfaces of input and output disks 4, 6 and 5, 7 via a traction oil film, and transmit power between input and output disks 4, 6 and 5, 7 via the traction oil film. Power rollers 8 and 9 are diametrically opposed to each other with respect to rotation axis $O_3$ of input and output disks 4–7.

Figure 1:
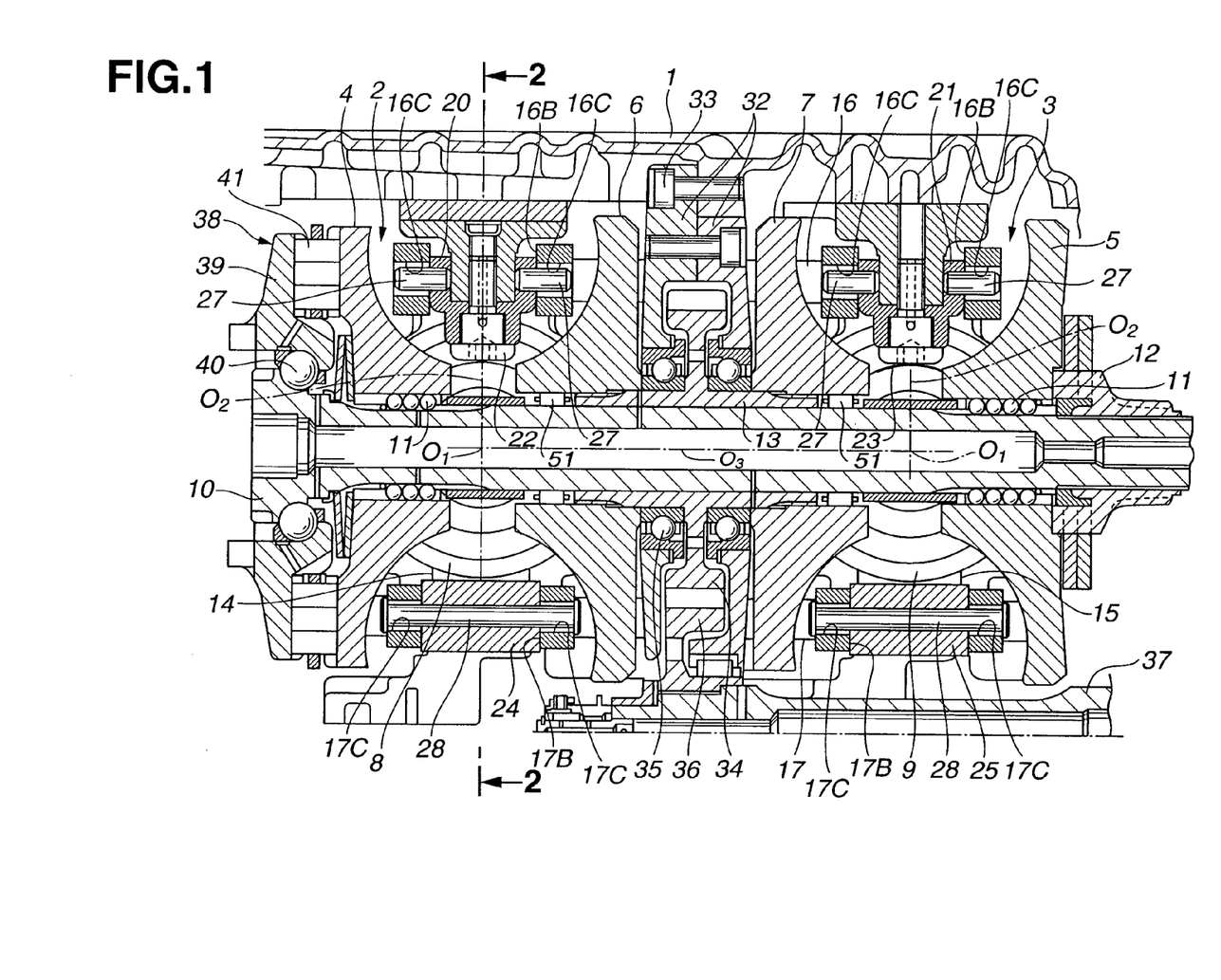
FIG. 1 is a longitudinal cross section of a toroidal continuously variable transmission (CVT) having a power roller support structure according to a first embodiment of the present invention.
Figure 2:
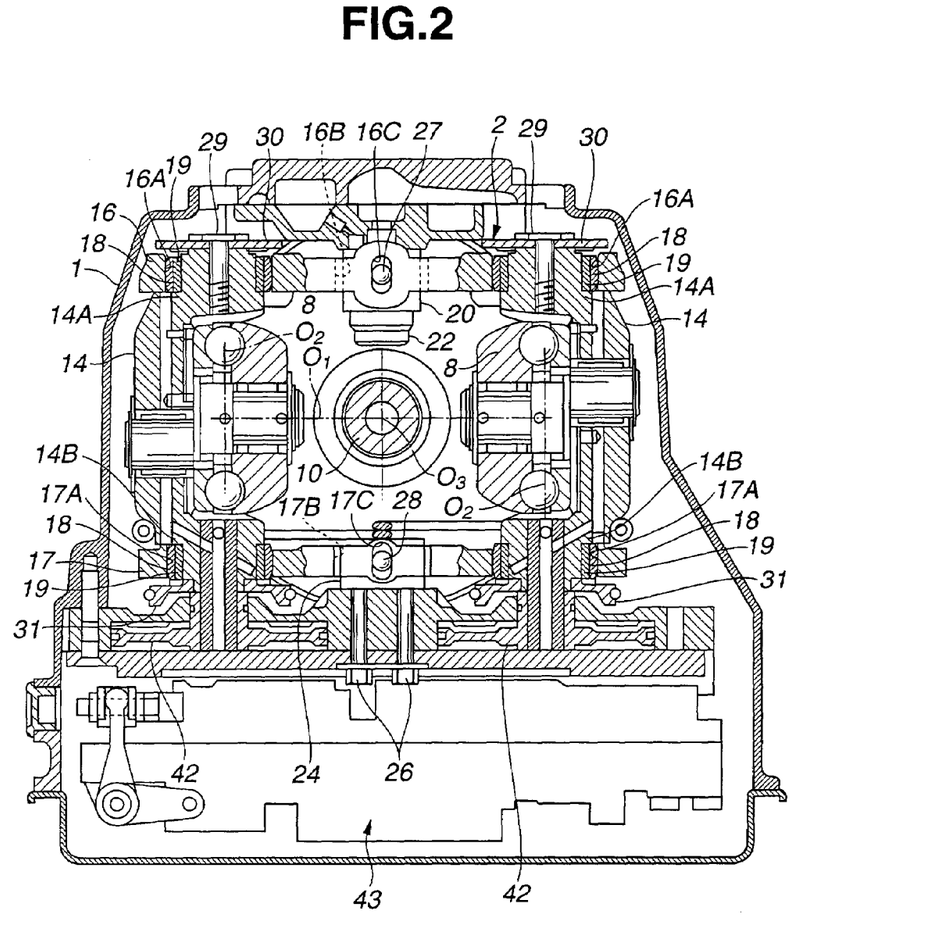
FIG. 2 is a cross section, taken along line 2—2 of FIG. 1.

Power rollers 8 and 9 are supported on trunnions 14 and 15, respectively, so as to be rotatable about rotation axes $O_1$. Only two trunnions 14 of front toroidal CVT unit 2 are illustrated in FIG. 2, but two trunnions 15 of rear toroidal CVT unit 3 have the same construction. As illustrated in FIG. 1, front and rear trunnions 14 and 15 have pivot axes (trunnion axes) $O_2$ extending perpendicular to rotation axes $O_1$ of power rollers 8 and 9. Front and rear trunnions 14 and 15 are pivotally moveable about pivot axes $O_2$ and have upper end portions, respectively, which are disposed near a top wall of transmission case 1. The upper end portions of front and rear trunnions 14 and 15 are connected with one another through upper link 16. Trunnion connection holes 16A are formed at four corners of generally rectangular plate-shaped upper link 16, only two of which are shown in FIG. 2. The upper end portions of front and rear trunnions 14 and 15 are engaged with respective trunnion connection holes 16A of upper link 16. Similarly, lower end portions of front and rear trunnions 14 and 15 are connected with one another through lower link 17. Lower link 17 has substantially the same configuration as that of upper link 16 and has trunnion connection holes 17A at four corners thereof. The lower end portions of front and rear trunnions 14 and 15 are engaged with trunnion connection holes 17A. Two of trunnion connection holes 17A for the lower end portions of front trunnions 14 are shown in FIG. 2.

Front and rear trunnions 14 and 15 are rotatably and angularly moveably connected to upper and lower links 16 and 17 via a combined joint. The combined joint is formed by spherical joint 18 fitted into trunnion connection holes 16A and 17A, and roller bearing 19 installed between spherical joint 18 and respective upper and lower end portions of front and rear trunnions 14 and 15. Upper and lower links 16 and 17 hold front and rear trunnions 14 and 15 in place such that power rollers 8 and 9 can be prevented from being pushed out from the respective toroidal cavity formed by the contact surfaces of input and output disks 4, 6 and 5, 7 by a loading force applied to input and output disks 4, 6 and 5, 7 as explained later.

As seen from FIGS. 1 and 2, upper link support 20 is disposed between front trunnions 14 and fixed to the top wall of transmission case 1 by means of bolt 22. Similarly, upper link support 21 is disposed between rear trunnions 15 and fixed to the top wall of transmission case 1 by means of bolt 23. As seen from FIGS. 1 and 2, lower link support 24 is disposed between front trunnions 14 and fixed to a bottom wall of transmission case 1 by means of bolts 26. Similarly, lower link support 25 is disposed between rear trunnions 15 and fixed to the bottom wall of transmission case 1 by means of bolts, not shown. As illustrated in FIGS. 1 and 2, upper link 16 is formed with openings 16B into which upper link supports 20 and 21 are inserted, and lower link 17 is formed with openings 17B into which lower link supports 24 and 25 are inserted. Pins 27 are mounted to upper link supports 20 and 21, and pins 28 are mounted to lower link supports 24 and 25. As shown in FIG. 1, pins 27 and 28 extend in a direction of the axis of main shaft, namely, rotation axis $O_3$ of input and output disks 4–7. Upper link 16 is formed with hole 16C in which pins 27 are engaged, and lower link 17 is formed with hole 17C in which pins 28 are received. Holes 16C and 17C have an elliptic shape elongated in a longitudinal direction of trunnions 14 and 15, namely, in the direction of pivot axes $O_2$, as shown in FIG. 2, and permit pins 27 and 28 to be displaced in the direction of pivot axes $O_2$. With the cooperation of holes 16C and 17C and pins 27 and 28, upper link 16 and lower link 17 are supported in such a manner as to be displaceable relative to link supports 20, 21 and 24, 25 and transmission case 1 in the direction of pivot axes $O_2$ of front and rear trunnions 14 and 15.

There is provided a structure for limiting the displacement of each of upper and lower links 16 and 17 and preventing upper and lower links 16 and 17 from interfering with components other than trunnions 14 and 15. The structure for limiting the displacement of upper link 16 includes stop plates 30 mounted to upper ends of front trunnions 14 and upper step portions 14A formed on front trunnions 14 axially adjacent to the upper end portions engaged with holes 16A of upper link 16 as shown in FIG. 2. Each of stop plates 30 is mounted to the upper ends of front trunnions 14 by screwing bolts 29 into the upper end portions of front trunnions 14. Each of upper step portions 14A supports thereon spherical joint 18 and roller bearing 19 of the combined joint mounted to each of the upper end portions of front trunnions 14. The structure for limiting the displacement of upper link 16 also includes stop plates 30 mounted to upper ends of rear trunnions 15 and upper step portions formed on rear trunnions 15, which are arranged similar to stop plates 30 and upper step portions 14A at front trunnions 14. Upper link 16 is interposed between stop plates 30 and upper step portions 14A of front trunnions 14 and between stop plates 30 and the upper step portions of rear trunnions 15. With the structure, upper link 16 can be limited in displacement in the direction of pivot axes $O_2$ of front and rear trunnions 14 and 15.

The structure for limiting the displacement of lower link 17 includes wire pulleys 31 fixed to lower ends of front trunnions 14 and lower step portions 14B formed on front trunnions 14 axially adjacent to the lower end portions engaged with holes 17A of lower link 17 as shown in FIG. 2. Each of lower step portions 14B supports thereon spherical joint 18 and roller bearing 19 of the combined joint mounted to each of the lower end portions of front trunnions 14. The structure for limiting the displacement of lower link 17 also includes wire pulleys 31 fixed to lower ends of rear trunnions 15 and lower step portions formed on rear trunnions 15, which have the same constructions as those of wire pulleys 31 and lower step portions 14B at front trunnions 14. Wire pulleys 31 are provided for synchronous pivot operation of front and rear toroidal CVT units 2 and 3. Lower link 17 is interposed between wire pulleys 31 and lower step portions 14B of front trunnions 14 and between wire pulleys 31 and the lower step portions of rear trunnions 15. With the structure, lower link 17 can be limited in displacement in the direction of pivot axes $O_2$ of front and rear trunnions 14 and 15.

Referring back to FIG. 1, gear housing 32 disposed between front and rear toroidal CVT units 2 and 3 is constituted of front and rear halves and fixed to transmission case 1 by means of fastening bolts 33. Gear housing 32 accommodates output gear 34 integrally formed with hollow output shaft 13. Output gear 34 is meshed with counter gear 36 connected with counter shaft 37. Gear housing 32 supports a middle portion of main shaft 10 so as to be rotatable relative to transmission case 1 via ball bearing 35.

Loading cam 38 transmits input rotation transmitted thereto to respective input disks 4 and 5 of front and rear toroidal CVT units 2 and 3. Namely, loading cam 38 transmits the input rotation to front input disk 4 and then rear input disk 5 via ball spline 11 and main shaft 10. Loading cam 38 includes cam flange 39 which is coaxially disposed with front input disk 4 and rotatably supported on main shaft 10 by means of radial and thrust bearing 40, and cam roller 41 interposed between front input disk 4 and cam flange 39. Loading cam 38 also applies a thrust load to front input disk 4, which is caused due to the relative rotation of cam flange 39 and front input disk 4 corresponding to the transmission torque. Front input disk 4 is urged toward front output disk 6 due to the thrust load. Reaction force to the thrust load is transmitted from cam flange 39 to rear input disk 5 via radial and thrust bearing 40, main shaft 10 and loading nut 12, so that rear input disk 5 is urged toward rear output disk 7. As a result, power rollers 8 and 9 are pressed against the contact surfaces of input and output disks 4, 6 and 5, 7, respectively, by the force corresponding to the transmission torque. This can allow transmission of power between input and output disks 4–7 via power rollers 8 and 9.

Figure 3:
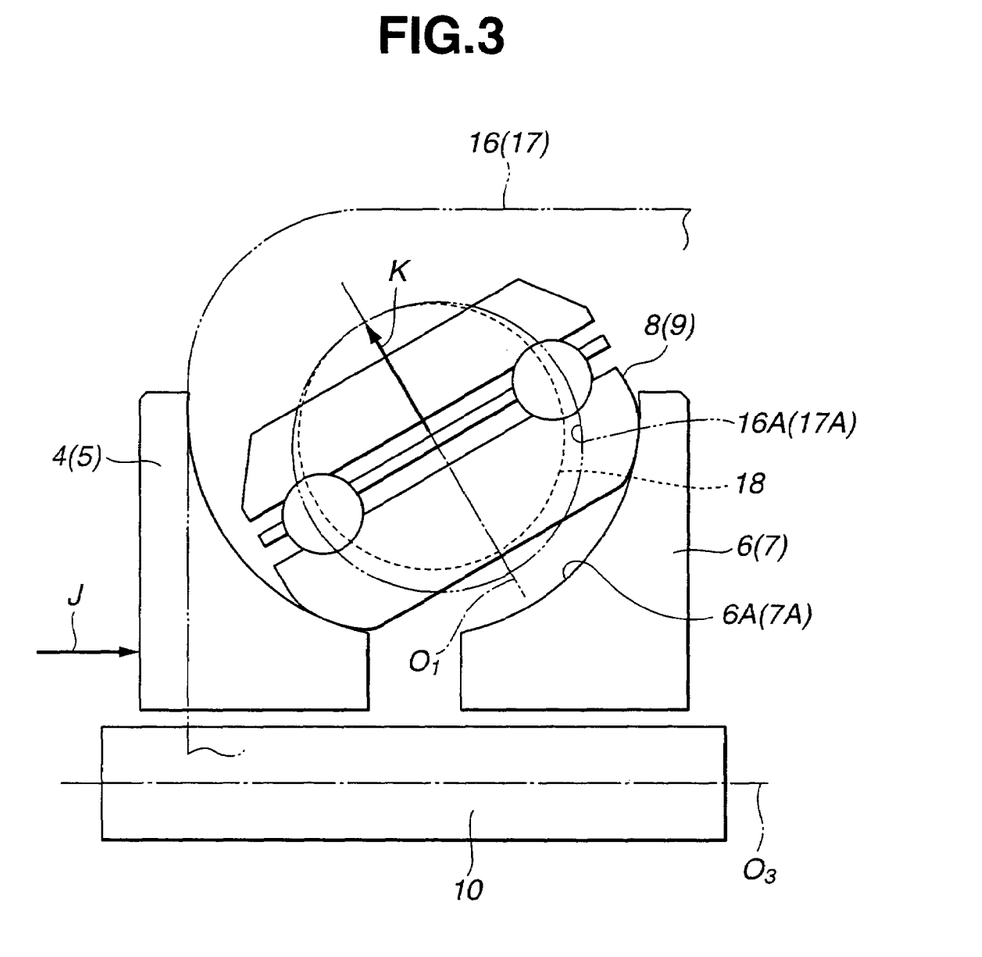
FIG. 3 is an explanatory diagram showing, in enlarged plan view, a power roller which is prevented from being pushed out by input and output disks in the toroidal CVT.

FIG. 3 shows the thrust load applied to front input disk 4 and the reaction force transmitted to rear input disk 5 as indicated at J in FIG. 3. Power rollers 8 and 9 are urged to move out from the toroidal cavity between input and output disks 4–7 in direction K extending along rotation axis $O_1$. In this state, spherical joint 18 mounted on each of the upper and lower end portions of trunnions 14 and 15 is pressed against a peripheral surface surrounding trunnion connection hole 16A and 17A of each of upper and lower links 16 and 17. Owing to the abutment of spherical joint 18 onto the peripheral surface of trunnion connection hole 16A and 17A, power rollers 8 and 9 can be prevented from being pushed out from the toroidal cavity in direction K.

As illustrated in FIG. 2, servo pistons 42 are coaxially connected with the lower ends of front trunnions 14. Similarly, servo pistons 42 are arranged at the lower ends of rear trunnions 15. Servo pistons 42 are driven by control valve 43 to synchronously stroke in the same phase (in the same speed-change direction). By thus operating servo pistons 42, the speed change control is performed.

Upon the speed change operation of the toroidal CVT, input rotation is transmitted to front and rear input disks 4 and 5 via loading cam 38 as described above. The rotation of input disks 4 and 5 is transmitted to power rollers 8 and 9 via the traction oil film formed therebetween. At this time, power rollers 8 and 9 are rotated about rotation axes $O_1$, $O_1$ and transmit the rotation to output disks 6 and 7 via the traction oil film formed therebetween. The rotation of output disks 6 and 7 is then transmitted to counter shaft 37 via output gear 34 and counter gear 36. Power rollers 8 and 9 are operated via trunnions 14 and 15 driven by servo pistons 42. When trunnions 14 and 15 are driven to synchronously move along pivot axes $O_2$ perpendicular to rotation axes $O_1$ of power rollers 8 and 9 at the identical stroke, power rollers 8 and 9 are synchronously offset from the initial positions (the non-speed change positions) shown in FIGS. 1 and 2 along pivot axes $O_2$ at the identical stroke. As a result, rotation axes $O_1$ of power rollers 8 and 9 are offset from rotation axis $O_3$ of input and output disks 4–7, and power rollers 8 and 9 are synchronously pivoted about pivot axes $O_2$ with the identical phase by component of force of the rotation of input disks 4 and 5. This causes continuous change in radius of circles traced by contact points between input disks 4 and 5 and power rollers 8 and 9 and circles traced by contact points between power rollers 8 and 9 and output disks 6 and 7. Speed ratio between input disk 4 and output disk 6 and speed ratio between input disk 5 and output disk 7 can be continuously varied while being kept equal to each other. When the speed ratios reach a preset value, the speed ratios can be maintained by operating power rollers 8 and 9 to move to the initial positions.

Figure 4:
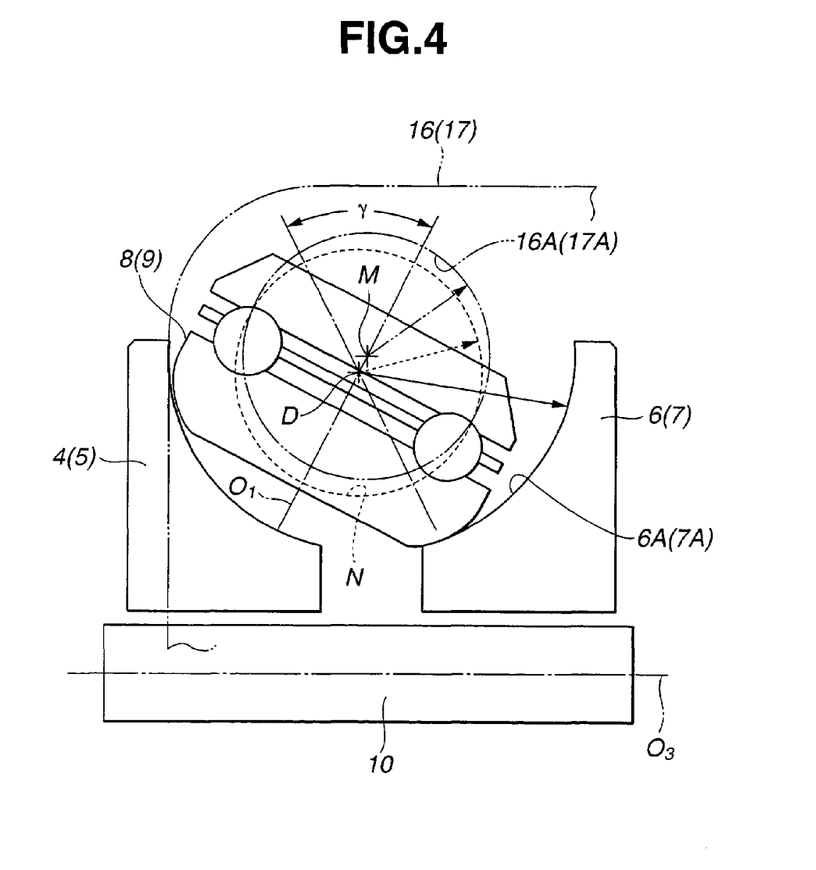
FIG. 4 is an explanatory diagram showing a trunnion connection hole of a link in the power roller support structure of the first embodiment.

FIG. 4 illustrates an arrangement of trunnion connection holes 16A of upper link 16 or trunnion connection holes 17A of lower link 17 in the power roller support structure. The arrangement is applied to at least one of upper link 16 and lower link 17. FIG. 4 is a projection drawing in which trunnion connection hole 16A and 17A as well as rotation axis $O_1$ of each of power rollers 8 and 9 are projected onto a plane which extends perpendicular to pivot axis $O_2$ of each of power rollers 8 and 9 and contains common rotation axis $O_3$ of input and output disks 4, 6 and 5, 7. Trunnion connection hole 16A and 17A is arranged for allowing power rollers 8 and 9 to move closer to rotation axis $O_3$ of input and output disks 4, 6 and 5, 7 along rotation axis $O_1$ of power rollers 8 and 9 when power rollers 8 and 9 are placed in the low speed ratio position than when power rollers 8 and 9 are placed in the high speed ratio position, in case that trunnion connection hole 16A and 17A as well as rotation axis $O_1$ of power rollers 8 and 9 are projected onto the plane described above. This arrangement is provided for counterbalancing displacement of power rollers 8 and 9 from a predetermined friction contact position relative to input and output disks 4, 6 and 5, 7 where a target speed ratio between rotational speeds of input and output disks 4, 6 and 5, 7 is obtained. The displacement will occur due to elastic deformation of trunnions 14 and 15 and input and output disks 4, 6 and 5, 7 which will be caused by the thrust load applied to input disks 4, 6 as discussed above.

In FIG. 4, power rollers 8 and 9 are placed in the high speed ratio position. Trunnion connection hole 16A and 17A has a generally circular shape, and more specifically, in this embodiment, has a circular shape in plan view as illustrated in FIG. 4. Center M of trunnion connection hole 16A and 17A is placed offset from center D of curvature of contact surface 6A and 7A of output disk 6 and 7 in such a direction as to be away from rotation axis $O_3$ of input and output disks 4, 6 and 5, 7 along rotation axis $O_1$ of power rollers 8 and 9, in case that trunnion connection hole 16A and 17A as well as rotation axis $O_1$ of power rollers 8 and 9 are projected onto the plane described above. Meanwhile, reference character N denotes an imaginary trunnion connection hole positioned concentrically with contact surface 6A and 7A of output disk 6 and 7. The periphery or contour defining trunnion connection hole 16A and 17A includes circumferential region γ pressed against the end portion of trunnion 14 and 15 to withstand a push-out force which is exerted on power rollers 8 and 9 to push power rollers 8 and 9 out from the toroidal cavity between input and output disks 4, 5 and 6, 7 during the pivotal movement of power rollers 8 and 9 between the high and low speed ratio positions. Circumferential region γ is configured such that an amount of approach of power rollers 8 and 9 relative to rotation axis $O_3$ is larger in the low speed ratio position than in the high speed ratio position. Circumferential region γ is also configured to provide the amounts of approach of power rollers 8 and 9 which are required corresponding to the respective speed ratio positions.

The thus-constructed power roller support structure of the first embodiment can perform the following effects. An amount of approach of power rollers 8 and 9 relative to rotation axis $O_3$ of input and output disks 4–7 is continuously variable corresponding to the respective speed ratio positions. Accordingly, the approach amount of power rollers 8 and 9 can be variably controlled in every speed ratio positions corresponding to displacement of contact positions of power rollers 8 and 9 relative to input and output disks 4, 5 and 6, 7. The displacement will occur due to deformation of trunnions 14 and 15 or input and output disks 4–7 which is caused by the pressing force applied to power rollers 8 and 9. As a result, power rollers 8 and 9 can be always surely in contact with input and output disks 4–7 in the predetermined contact position. Therefore, according to the power support structure of the first embodiment, the above-described problems of the related art can be eliminated.

Figure 5:
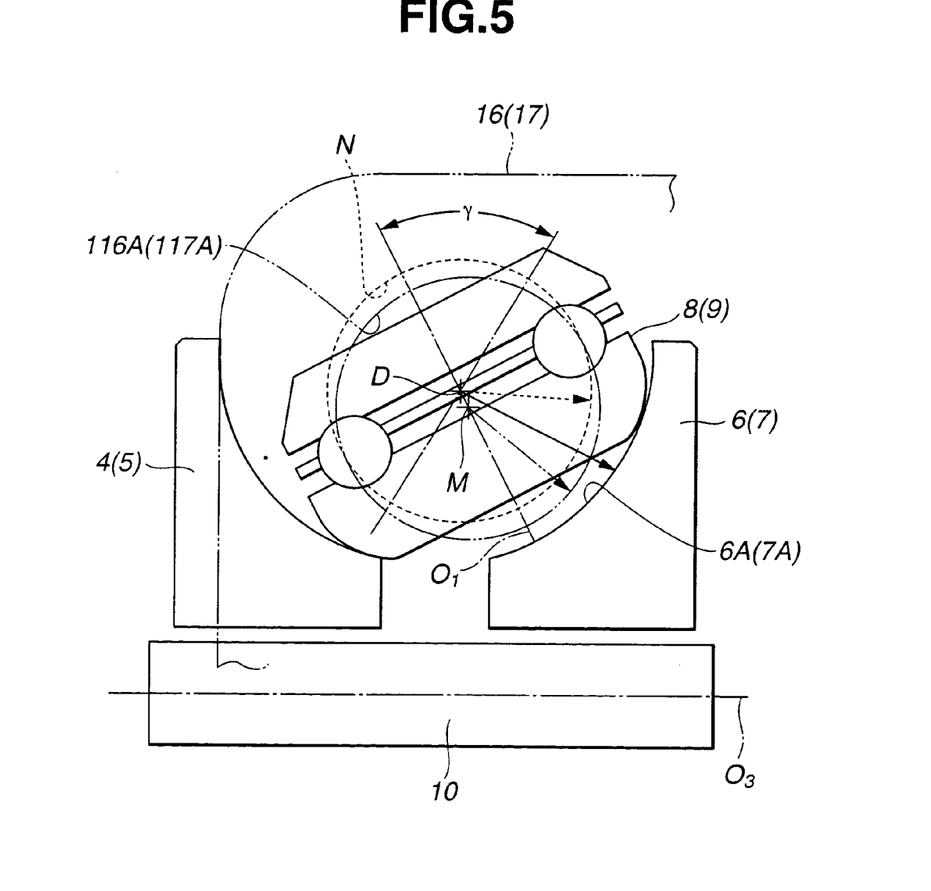
FIG. 5 is a diagram similar to FIG. 4, but showing a trunnion connection hole of a link in a second embodiment of the power roller support structure according to the present invention.

Referring to FIG. 5, a second embodiment of the present invention will be explained hereinafter, which differs in arrangement of the trunnion connection holes from the first embodiment. Like reference numerals and characteristics denote like parts, and therefore, detailed explanations therefor are omitted. Similar to the first embodiment, the arrangement is applied to at least one of upper link 16 and lower link 17. Reference numerals 116A and 117A denote each of the trunnion connection holes formed in upper link 16 and each of the trunnion connection holes formed in lower link 17. Trunnion connection hole 116A and 117A is arranged as follows in order to counterbalance displacement of power rollers 8 and 9 from the predetermined friction contact position relative to input and output disks 4, 6 and 5, 7. In FIG. 5, trunnion connection hole 116A and 117A as well as rotation axis $O_1$ of power rollers 8 and 9 are projected onto the plane as described in the first embodiment. Similar to the first embodiment, trunnion connection hole 116A and 117A is arranged for allowing power rollers 8 and 9 to move closer to rotation axis $O_3$ of input and output disks 4, 6 and 5, 7 along rotation axis $O_1$ of power rollers 8 and 9 when power rollers 8 and 9 are placed in the low speed ratio position than when power rollers 8 and 9 are placed in the high speed ratio position, in case that trunnion connection hole 116A and 117A as well as rotation axis $O_1$ of power rollers 8 and 9 are projected onto the plane described above.

Specifically, as illustrated in FIG. 5, trunnion connection hole 116A and 117A has a circular shape in plan view, similar to the first embodiment shown in FIG. 4. Power rollers 8 and 9 are placed in the low speed ratio position. In this state, center M of trunnion connection hole 116A and 117A is placed offset from center D of curvature of contact surface 6A and 7A of output disk 6 and 7 in such a direction as to come close to rotation axis $O_3$ of input and output disks 4–7 along rotation axis $O_1$ of power rollers 8 and 9, in case that trunnion connection hole 116A and 117A as well as rotation axis $O_1$ of power rollers 8 and 9 are projected onto the plane. The periphery or contour defining trunnion connection hole 116A and 117A includes circumferential region γ configured as described in the first embodiment.

The thus-constructed power roller support structure of the second embodiment can perform the same effects as described in the first embodiment.

Figure 6:
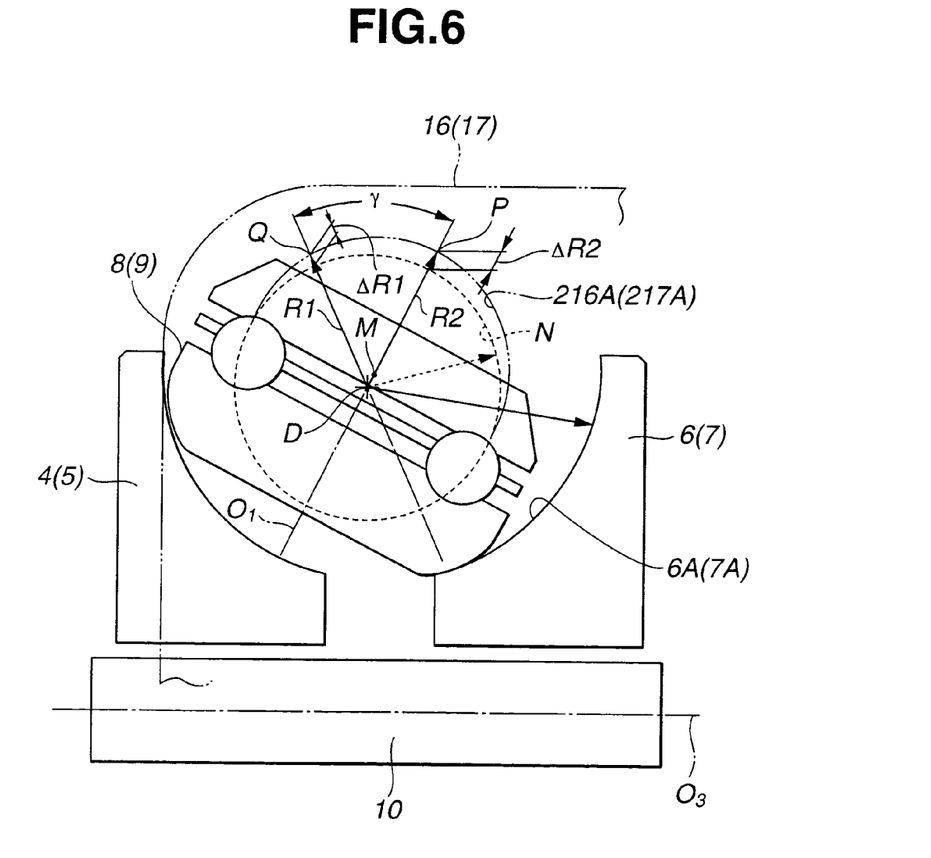
FIG. 6 is a diagram similar to FIG. 4, but showing a trunnion connection hole of a link in a third embodiment of the power roller support structure according to the present invention.

Referring to FIG. 6, a third embodiment of the present invention will be explained hereinafter, which differs in arrangement of the trunnion connection holes from the first and second embodiments. Similar to the first and second embodiments, the arrangement is applied to at least one of upper link 16 and lower link 17. Reference numerals 216A and 217A denote each of the trunnion connection holes formed in upper link 16 and each of the trunnion connection holes formed in lower link 17. Trunnion connection hole 216A and 217A is arranged as follows in order to counterbalance displacement of power rollers 8 and 9 from the predetermined friction contact position relative to input and output disks 4, 6 and 5, 7. In FIG. 6, trunnion connection hole 216A and 217A as well as rotation axis $O_1$ of power rollers 8 and 9 are projected onto the plane as described in the first embodiment. Similar to the first and second embodiments, trunnion connection hole 216A and 217A is arranged for allowing power rollers 8 and 9 to move closer to rotation axis $O_3$ of input and output disks 4, 6 and 5, 7 along rotation axis $O_1$ of power rollers 8 and 9 when power rollers 8 and 9 are placed in the low speed ratio position than when power rollers 8 and 9 are placed in the high speed ratio position, in case that trunnion connection hole 216A and 217A as well as rotation axis $O_1$ of power rollers 8 and 9 are projected onto the plane described above.

Specifically, as illustrated in FIG. 6, trunnion connection hole 216A and 217A has a generally circular shape in plan view. Trunnion connection hole 216A and 217A is formed by modifying imaginary trunnion connection hole N. Imaginary trunnion connection hole N has a circular shape having a center which is aligned with center D of curvature of contact surface 6A and 7A of output disk 6 and 7. Trunnion connection hole 216A and 217A has a radially enlarged portion as compared to imaginary trunnion connection hole N. The periphery or contour defining trunnion connection hole 216A and 217A includes a radius increasing portion as indicated by two-dotted broken line. At the radius increasing portion, a radius of trunnion connection hole 216A and 217A is increased in such a direction as to be away from rotation axis $O_3$ of input and output disks 4, 6 and 5, 7 along rotation axis $O_1$ of power rollers 8 and 9 placed in the high speed ratio position, in case that trunnion connection hole 216A and 217A as well as rotation axis $O_1$ of power rollers 8 and 9 are projected onto the plane. Thus, trunnion connection hole 216A and 217A is enlarged by an increased area defined between the radius increasing portion and the corresponding peripheral portion of imaginary trunnion connection hole N. The radius increasing portion includes circumferential region γ extending between high-side bearing portion P and low-side bearing portion Q. High-side bearing portion P is pressed against the end portion of trunnion 14 and 15 to withstand the push-out force exerted on power rollers 8 and 9 when power rollers 8 and 9 are placed in the high speed ratio position. Low-side bearing portion Q is pressed against the end portion of trunnion 14 and 15 to withstand the push-out force exerted on power rollers 8 and 9 when power rollers 8 and 9 are placed in the low speed ratio position. High-side bearing portion P is located more distant from center D of curvature of contact surface 6A and 7A of output disk 6 and 7 than low-side bearing portion Q. Preferably, the radius increasing portion includes two sectoral regions disposed adjacent to each other on both sides of rotation axis $O_1$ of power rollers 8 and 9 placed in the low speed ratio position, each having a central angle of substantially 90 degrees.

Specifically, distance R2 between high-side bearing portion P and center D of curvature of contact surface 6A and 7A of output disk 6 and 7 is larger than distance R1 between low-side bearing portion Q and center D of curvature thereof. Here, distance R2 is larger than a radius of imaginary trunnion connection hole N by difference $\Delta R2$. Distance R1 is larger than the radius of imaginary trunnion connection hole N by difference $\Delta R1$. Circumferential region γ has a curvature continuously varying such that distance R2 becomes larger than distance R1 by difference $\Delta R2 - \Delta R1$.

The thus-constructed power roller support structure of the third embodiment can perform the same effects as described in the first embodiment.

Figure 7:
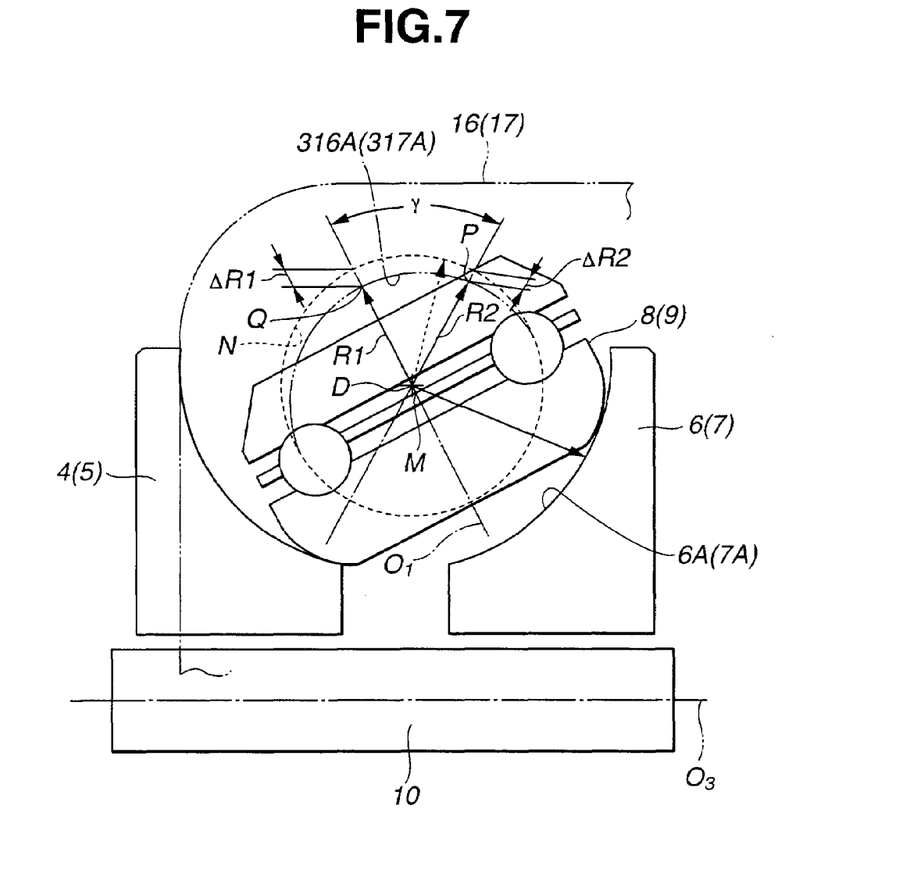
FIG. 7 is a diagram similar to FIG. 4, but showing a trunnion connection hole of a link in a fourth embodiment of the power roller support structure according to the present invention.

Referring to FIG. 7, a fourth embodiment of the present invention will be explained hereinafter, which differs in arrangement of the trunnion connection holes from the first through third embodiments. Similar to the first through third embodiments, the arrangement is applied to at least one of upper link 16 and lower link 17. Reference numerals 316A and 317A denote each of the trunnion connection holes formed in upper link 16 and each of the trunnion connection holes formed in lower link 17. Trunnion connection hole 316A and 317A is arranged as follows in order to counterbalance displacement of power rollers 8 and 9 from the predetermined friction contact position relative to input and output disks 4, 6 and 5, 7. In FIG. 7, trunnion connection hole 316A and 317A as well as rotation axis $O_1$ of power rollers 8 and 9 are projected onto the plane as described in the first embodiment. Similar to the first through third embodiments, trunnion connection hole 316A and 317A is arranged for allowing power rollers 8 and 9 to move closer to rotation axis $O_3$ of input and output disks 4, 6 and 5, 7 along rotation axis $O_1$ of power rollers 8 and 9 when power rollers 8 and 9 are placed in the low speed ratio position than when power rollers 8 and 9 are placed in the high speed ratio position, in case that trunnion connection hole 316A and 317A as well as rotation axis $O_1$ of power rollers 8 and 9 are projected onto the plane described above.

As illustrated in FIG. 7, trunnion connection hole 316A and 317A has a generally circular shape in plan view. Trunnion connection hole 316A and 317A is formed by modifying imaginary trunnion connection hole N. Imaginary trunnion connection hole N has a circular shape having a center which is aligned with center D of curvature of contact surface 6A and 7A of output disk 6 and 7. Trunnion connection hole 316A and 317A has a radially reduced portion as compared to imaginary trunnion connection hole N. The periphery or contour defining trunnion connection hole 316A and 317A includes a radius reducing portion as indicated by two-dotted broken line. At the radius reducing portion, a radius of trunnion connection hole 316A and 317A is reduced in such a direction as to come close to rotation axis $O_3$ of input and output disks 4–7 along rotation axis $O_1$ of power rollers 8 and 9 placed in the low speed ratio position, in case that trunnion connection hole 316A and 317A as well as rotation axis $O_1$ of power rollers 8 and 9 are projected onto the plane. Thus, trunnion connection hole 316A and 317A is reduced by a reduced area defined between the radius reducing portion and the corresponding peripheral portion of imaginary trunnion connection hole N. The radius reducing portion includes circumferential region γ extending between high-side bearing portion P and low-side bearing portion Q. High-side bearing portion P and low-side bearing portion Q correspond to the high speed ratio position of power rollers 8 and 9 and the low speed ratio position thereof, respectively, as explained in the third embodiment. High-side bearing portion P is located more distant from center D of curvature of contact surface 6A and 7A of output disk 6 and 7 than low-side bearing portion Q. Preferably, the radius reducing portion includes two sectoral regions disposed adjacent to each other on both sides of rotation axis $O_1$ of power rollers 8 and 9 placed in the low speed ratio position, each having a central angle of substantially 90 degrees.

Specifically, distance R1 between low-side bearing portion Q and center D of curvature of contact surface 6A and 7A of output disk 6 and 7 is smaller than distance R2 between high-side bearing portion P and center D of curvature thereof. Here, distance R1 is smaller than the radius of imaginary trunnion connection hole N by difference $\Delta R1$, and distance R2 is smaller than a radius of imaginary trunnion connection hole N by difference $\Delta R2$. Circumferential region γ has a curvature continuously varying such that distance R1 becomes smaller than distance R2 by difference $\Delta R1 - \Delta R2$.

The thus-constructed power roller support structure of the fourth embodiment can perform the same effects as described in the first embodiment.

Further, in another aspect, in the power roller support structure of the first through fourth embodiments shown in FIGS. 4–7, each of trunnion connection holes 16A, 17A, 116A, 117A, 216A, 217A, 316A and 317A has a generally circular shape which has a diameter extending across center D of curvature of contact surface 6A and 7A of output disk 6 and 7 along rotation axis $O_1$ of power rollers 8 and 9 when power rollers 8 and 9 are placed in each of the high and low speed ratio positions, in case that trunnion connection hole 16A, 17A, 116A, 117A, 216A, 217A, 316A and 317A and rotation axis $O_1$ are projected onto the plane which extends perpendicular to pivot axis $O_2$ and contains rotation axis $O_3$ of input and output disks 4–7 and center D of curvature of contact surface 6A and 7A. Midpoint M of the diameter is offset from center D of curvature of contact surface 6A and 7A of output disk 6 and 7. Specifically, in the first embodiment shown in FIG. 4, trunnion connection hole 16A and 17A has a circular shape having a diameter whose midpoint M is offset from center D of curvature of contact surface 6A and 7A in such a direction as to be away from rotation axis $O_3$ along rotation axis $O_1$ of power rollers 8 and 9 placed in the high speed ratio position. In the second embodiment shown in FIG. 5, trunnion connection hole 116A and 117A has a circular shape having a diameter whose midpoint M is offset from center D of curvature of contact surface 6A and 7A in such a direction as to come close to rotation axis $O_3$ along rotation axis $O_1$ of power rollers 8 and 9 placed in the low speed ratio position. In the third embodiment shown in FIG. 6, trunnion connection hole 216A and 217A has a generally circular shape modified to be partially enlarged in radius, which has a diameter whose midpoint M is offset from center D of curvature of contact surface 6A and 7A in such a direction as to be away from rotation axis $O_3$ along rotation axis $O_1$ of power rollers 8 and 9 placed in the high speed ratio position. In the fourth embodiment shown in FIG. 7, trunnion connection hole 316A and 317A has a generally circular shape modified to be partially enlarged in radius, which has a diameter whose midpoint M is offset from center D of curvature of contact surface 6A and 7A in such a direction as to come close to rotation axis $O_3$ along rotation axis $O_1$ of power rollers 8 and 9 placed in the low speed ratio position.

In a case where trunnion connection holes 16A and 17A of the first embodiment are provided in upper link 16 and lower link 17, respectively, the away-offset amount of center M of trunnion connection holes 16A relative to center D of curvature of contact surface 6A and 7A of output disk 6 and 7 may or may not be set equal to the away-offset amount of center M of trunnion connection holes 17A relative thereto. Further, in a case where trunnion connection holes 116A and 117A of the second embodiment are provided in upper link 16 and lower link 17, respectively, the close-offset amount of center M of trunnion connection holes 116A relative to center D of curvature of contact surface 6A and 7A of output disk 6 and 7 may or may not be set equal to the close-offset amount of center M of trunnion connection holes 117A. If the offset amounts of center M of trunnion connection holes 16A, 17A and 116A, 117A are set to different values, trunnions 14 and 15 will be inclined relative to pivot axis $O_2$ due to the difference between the offset amounts thereof. Therefore, the difference between the offset amounts must be limited to a certain extent in which an adverse influence on the operation of the toroidal CVT can be avoided.

Further, in a case where trunnion connection holes 216A and 217A of the third embodiment are provided in upper and lower links 16 and 17, respectively, the increase amount of the radius increasing portion of the periphery of trunnion connection hole 216A may or may not be set equal to the increase amount of the radius increasing portion of the periphery of trunnion connection hole 217A. If the increase amounts are set to different values, trunnions 14 and 15 will be inclined relative to pivot axis $O_2$ due to the difference between the increase amounts. Therefore, the difference between the increase amounts must be limited to such a certain extent that no excessive inclination of trunnions 14 and 15 is generated to cause adverse influence on the operation of the toroidal CVT. Furthermore, in a case where trunnion connection holes 316A and 317A of the fourth embodiment are provided in upper and lower links 16 and 17, respectively, the reduction amount of the radius reducing portion of the periphery of trunnion connection hole 316A may or may not be set equal to the reduction amount of the radius reducing portion of the periphery of trunnion connection hole 317A. If the reduction amounts are set to different values, there will occur inclination of trunnions 14 and 15 relative to pivot axis $O_2$ due to the difference between the reduction amounts. For this reason, the difference between the reduction amounts must be limited to such a certain extent that no excessive inclination of trunnions 14 and 15 occurs to cause adverse influence on the operation of the toroidal CVT.

This application is based on a prior Japanese Patent Application No. 2002-229872 filed on Aug. 7, 2002. The entire contents of the Japanese Patent Application No. 2002-229872 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power roller supporting structure for a toroidal continuously variable transmission, the power roller supporting structure comprising:

a moveable disk rotatable about a first axis and axially moveable;

a stationary disk rotatable about the first axis and axially fixed, each of the moveable and stationary disks having a contact surface;

power rollers disposed between the moveable and stationary disks in contact with the contact surfaces thereof, each of the power rollers being rotatable about a second axis and pivotally moveable about a third axis extending perpendicular to the second axis upon rotation of the moveable and stationary disks, the power rollers having a friction contact position relative to the moveable and stationary disks in which a speed ratio between rotational speeds of the moveable and stationary disks is determined, the friction contact position including a low speed ratio position where a reduced speed ratio is obtained and a high speed ratio position where an increased speed ratio is obtained;

trunnions supporting the power rollers so as to allow the rotation of the power rollers about the second axis and the pivotal movement thereof about the third axis, each of the trunnions having end portions opposed in a direction of the third axis, wherein the arrangement comprises:

a first link including a first periphery defining a first trunnion connection hole engaged with one of the end portions of each of the trunnions; and a second link including a second periphery defining a second trunnion connection hole engaged with the other of the end portions of each of the trunnions;

at least one of the first and second trunnion connection holes being arranged to allow the power rollers to move closer to the first axis along the second axis when the power rollers are placed in the low speed ratio position than when the power rollers are placed in the high speed ratio position.

2. The power roller supporting structure as claimed in claim 1, wherein at least one of the first and second trunnion connection holes has a center which is offset from a center of curvature of the contact surface of the stationary disk in such a direction as to be away from the first axis along the second axis when the power rollers are placed in the high speed ratio position, in case that the at least one of the first and second connection holes and the second axis are projected onto a plane which extends perpendicular to the third axis and contains the first axis and the center of curvature of the contact surface of the stationary disk.

3. The power roller supporting structure as claimed in claim 1, wherein at least one of the first and second trunnion connection holes has a center which is offset from a center of curvature of the contact surface of the stationary disk in such a direction as to come close to the first axis along the second axis when the power rollers are placed in the low speed ratio position, in case that the at least one of the first and second trunnion connection holes and the second axis are projected onto a plane which extends perpendicular to the third axis and contains the first axis and the center of curvature of the contact surface of the stationary disk.

4. The power roller supporting structure as claimed in claim 1, wherein at least one of the first and second trunnion connection holes has a generally circular shape, the at least one of the first and second peripheries including a radius increasing portion at which the trunnion connection hole is increased in radius in such a direction as to be away from the first rotation axis along the second rotation axis placed in the high speed ratio position, in case that the at least one of the first and second peripheries of the first and second links and the second axis are projected onto a plane which extends perpendicular to the third axis and contains the first axis and a center of curvature of the contact surface of the stationary disk, the radius increasing portion including a high-side bearing portion which is pressed against the end portion of the trunnion when the power rollers are placed in the high speed ratio position, and a low-side bearing portion which is pressed against the end portion of the trunnion when the power rollers are placed in the low speed ratio position, the high-side bearing portion being located more distant from the center of curvature of the contact surface of the stationary disk than the low-side bearing portion.

5. The power roller supporting structure as claimed in claim 4, wherein the radius increasing portion includes two sectoral regions disposed adjacent to each other on both sides of the second axis within the plane when the power rollers are placed in the high speed ratio position, each of the sectoral regions having a central angle of substantially 90 degrees.

6. The power roller supporting structure as claimed in claim 1, wherein at least one of the first and second trunnion connection holes has a generally circular shape, the at least one of the first and second peripheries including a radius reducing portion at which the trunnion connection hole is reduced in radius in such a direction as to come close to the first rotation axis along the second rotation axis placed in the low speed ratio position, in case that the at least one of the first and second peripheries of the first and second links and the second axis are projected onto a plane which extends perpendicular to the third axis and contains the first axis and a center of curvature of the contact surface of the stationary disk, the radius reducing portion including a high-side bearing portion which is pressed against the end portion of the trunnion when the power rollers are placed in the high speed ratio position, and a low-side bearing portion which is pressed against the end portion of the trunnion when the power rollers are placed in the low speed ratio position, the high-side bearing portion being located more distant from the center of curvature of the contact surface of the stationary disk than the low-side bearing portion.

7. The power roller supporting structure as claimed in claim 6, wherein the radius reducing portion includes two sectoral regions disposed adjacent to each other on both sides of the second axis in the plane when the power rollers are placed in the low speed ratio position, each of the sectoral regions having a central angle of substantially 90 degrees.

8. The power roller supporting structure as claimed in claim 1, wherein at least one of the first and second trunnion connection holes has a generally circular shape which has a diameter extending across a center of curvature of the contact surface of the stationary disk along the second axis when the power rollers are placed in each of the high and low speed ratio positions, a midpoint of the diameter being offset from the center of curvature of the contact surface of the stationary disk, in case that the trunnion connection hole having a generally circular shape and the second axis are projected onto a plane which extends perpendicular to the third axis and contains the first axis and the center of curvature of the contact surface of the stationary disk.

9. The power roller supporting structure as claimed in claim 8, wherein the midpoint of the diameter is offset from the center of curvature of the contact surface of the stationary disk in such a direction as to be away from the first axis along the second axis when the power rollers are placed in the high speed ratio position.

10. The power roller supporting structure as claimed in claim 9, wherein the at least one of the first and second trunnion connection holes has a circular shape which is centered at the midpoint of the diameter.

11. The power roller supporting structure as claimed in claim 8, wherein the midpoint of the diameter is offset from the center of curvature of the contact surface of the stationary disk in such a direction as to come close to the first axis along the second axis when the power rollers are placed in the low speed ratio position.

12. The power roller supporting structure as claimed in claim 11, wherein the at least one of the first and second trunnion connection holes has a circular shape which is centered at the midpoint of the diameter.

13. The power roller supporting structure as claimed in claim 8, wherein the at least one of the first and second trunnion connection holes has a modified circular shape including a radially enlarged portion, the at least one of the first and second peripheries of the first and second links including a radius increasing portion at which the trunnion connection hole is increased in radius in such a direction as to be away from the first rotation axis along the second rotation axis placed in the high speed ratio position upon viewing the plane, the radius increasing portion including a high-side bearing portion which is pressed against the end portion of the trunnion when the power rollers are placed in the high speed ratio position, and a low-side bearing portion pressed against the end portion of the trunnion when the power rollers are placed in the low speed ratio position, the high-side bearing portion being located more distant from the center of curvature of the contact surface of the stationary disk than the low-side bearing portion.

14. The power roller supporting structure as claimed in claim 13, wherein the radius increasing portion includes two sectoral regions disposed adjacent to each other on both sides of the second axis within the plane when the power rollers are placed in the high speed ratio position, each of the sectoral regions having a central angle of substantially 90 degrees.

15. The power roller supporting structure as claimed in claim 8, wherein the at least one of the first and second trunnion connection holes has a modified circular shape including a radially reduced portion, the at least one of the first and second peripheries of the first and second links including a radius reducing portion at which the trunnion connection hole is reduced in radius in such a direction as to come close to the first rotation axis along the second rotation axis placed in the low speed ratio position upon viewing the plane, the radius reducing portion including a high-side bearing portion which is pressed against the end portion of the trunnion when the power rollers are placed in the high speed ratio position, and a low-side bearing portion which is pressed against the end portion of the trunnion when the power rollers are placed in the low speed ratio position, the high-side bearing portion being located more distant from the center of curvature of the contact surface of the stationary disk than the low-side bearing portion.

16. The power roller supporting structure as claimed in claim 15, wherein the radius reducing portion includes two sectoral regions disposed adjacent to each other on both sides of the second axis in the plane when the power rollers are placed in the low speed ratio position, each of the sectoral regions having a central angle of substantially 90 degrees.

\* \* \* \* \*